B. A. PARKES.
TEXTILE DRYING MACHINE.
APPLICATION FILED MAR. 18, 1919.
1,407,081.
Patented Feb. 21, 1922.
9 SHEETS—SHEET 9.
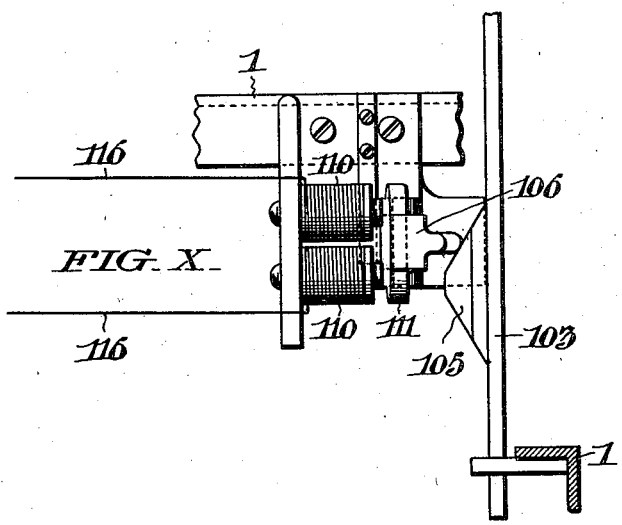
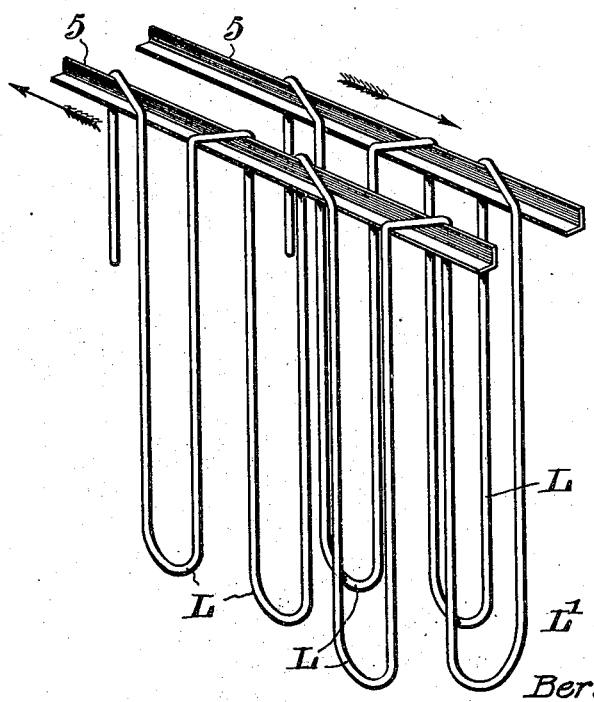

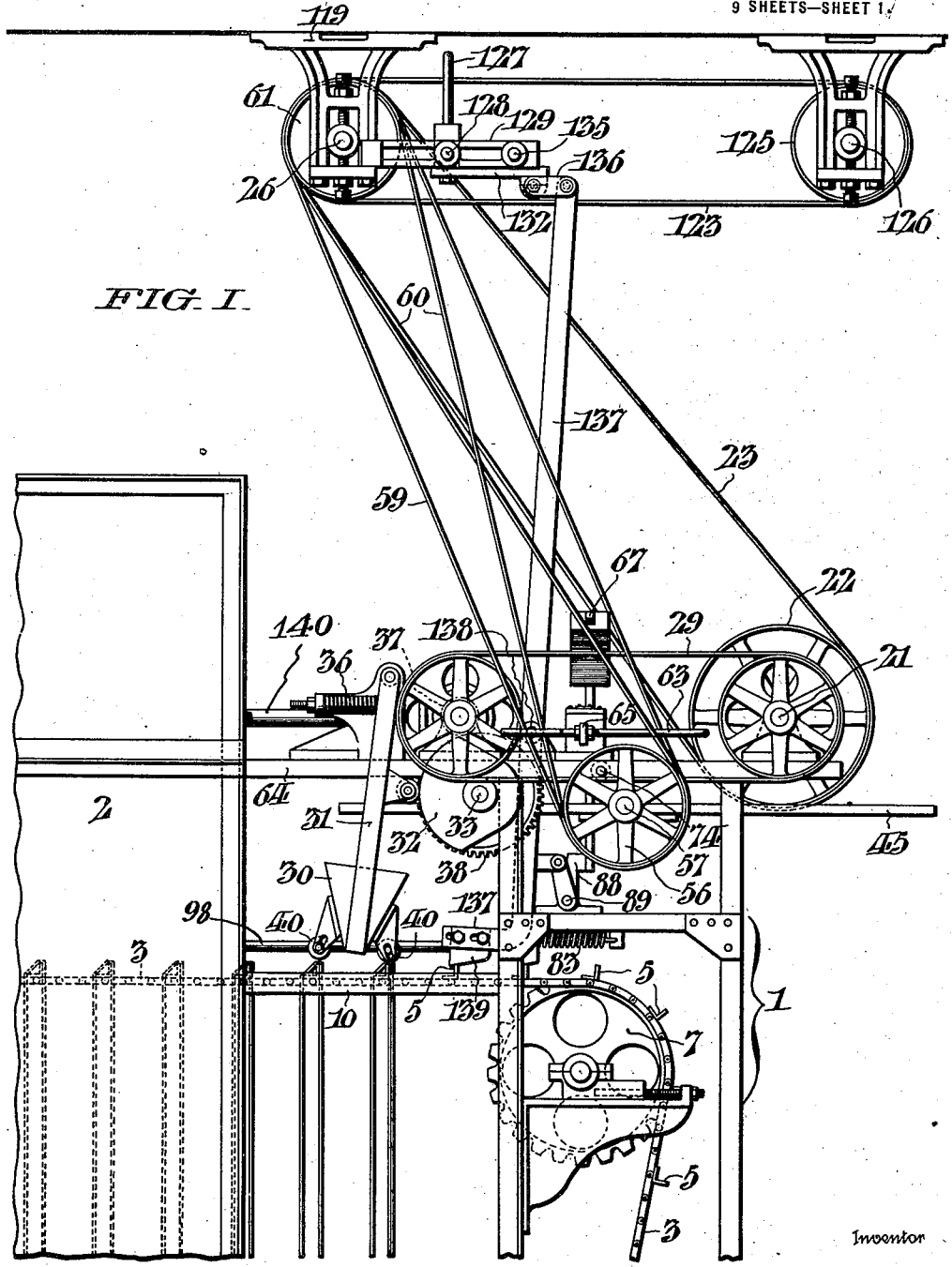

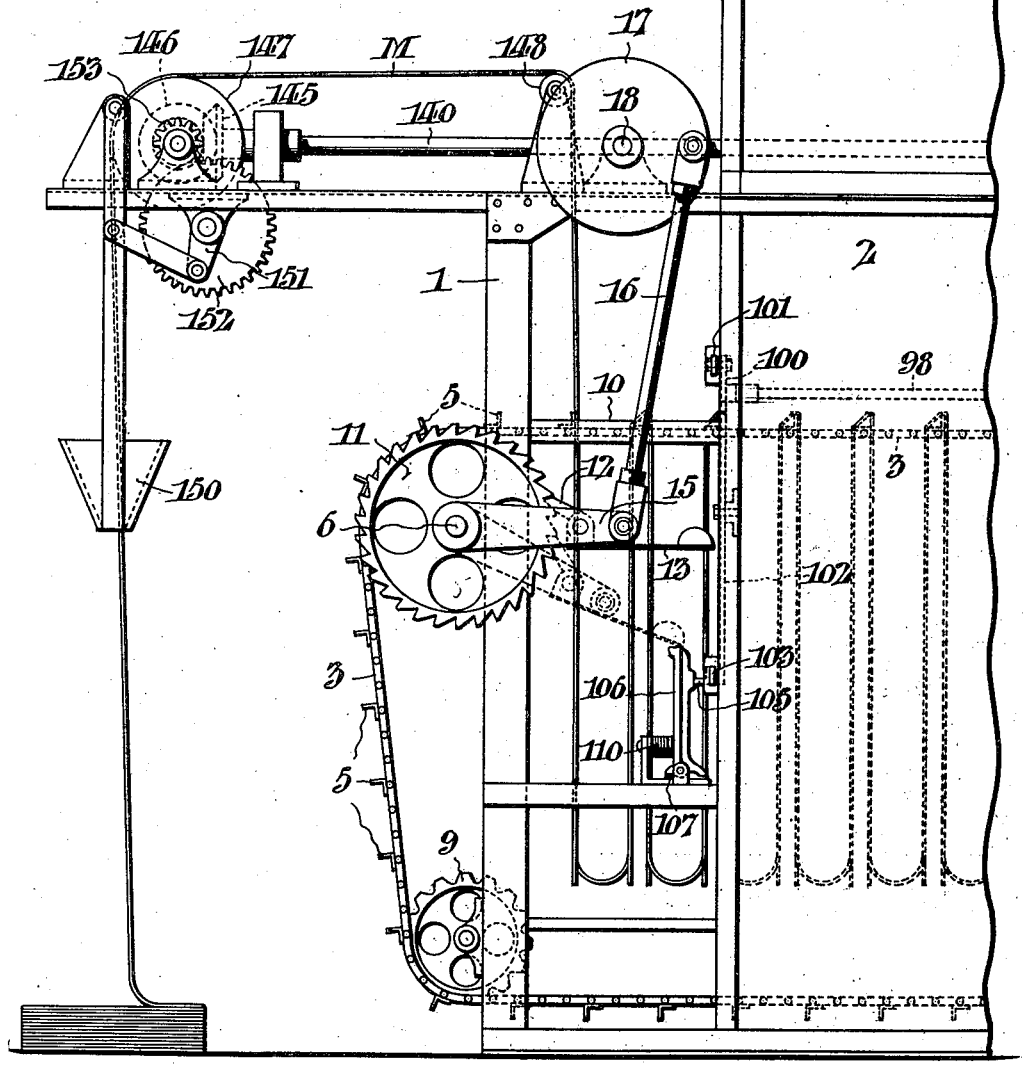

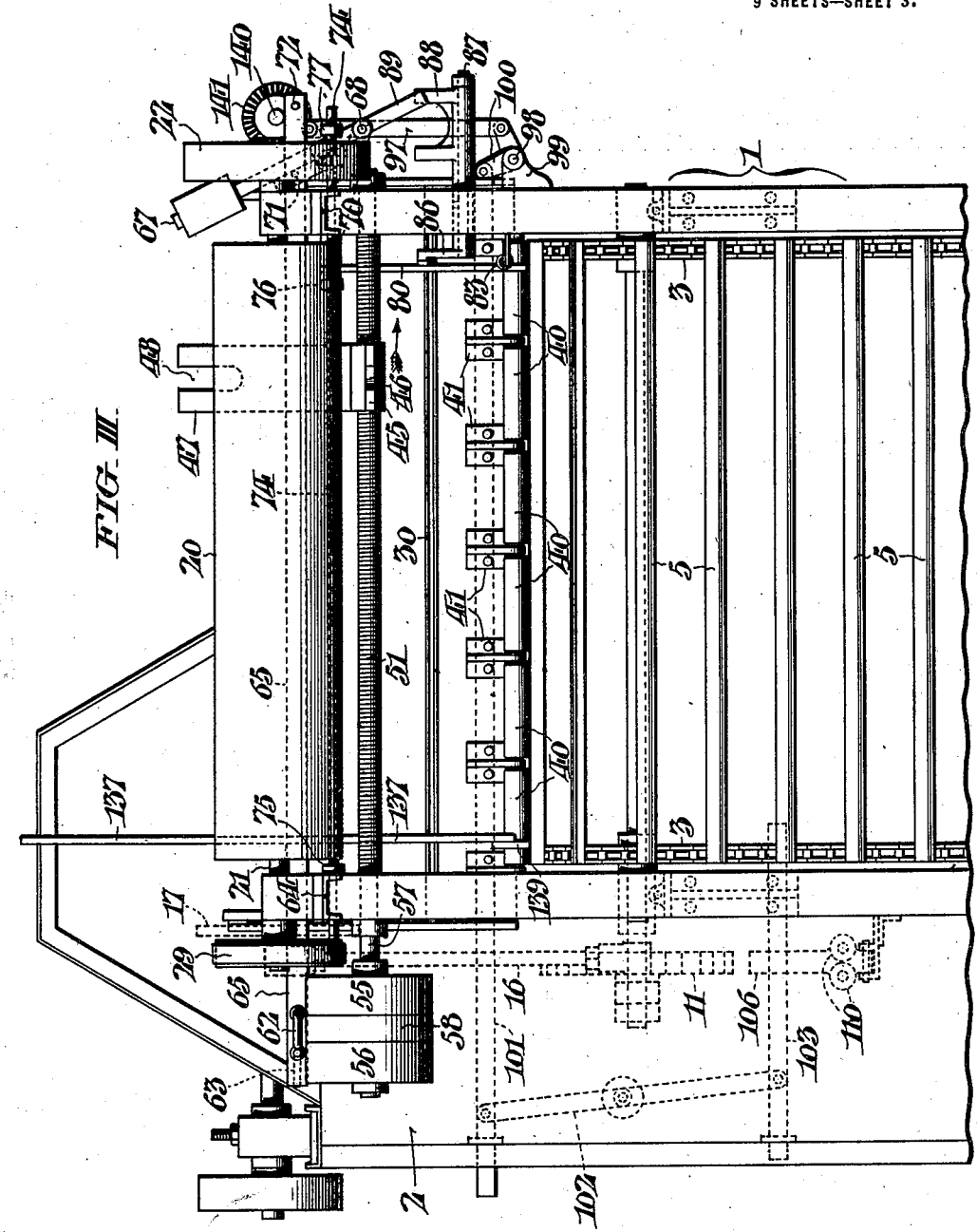

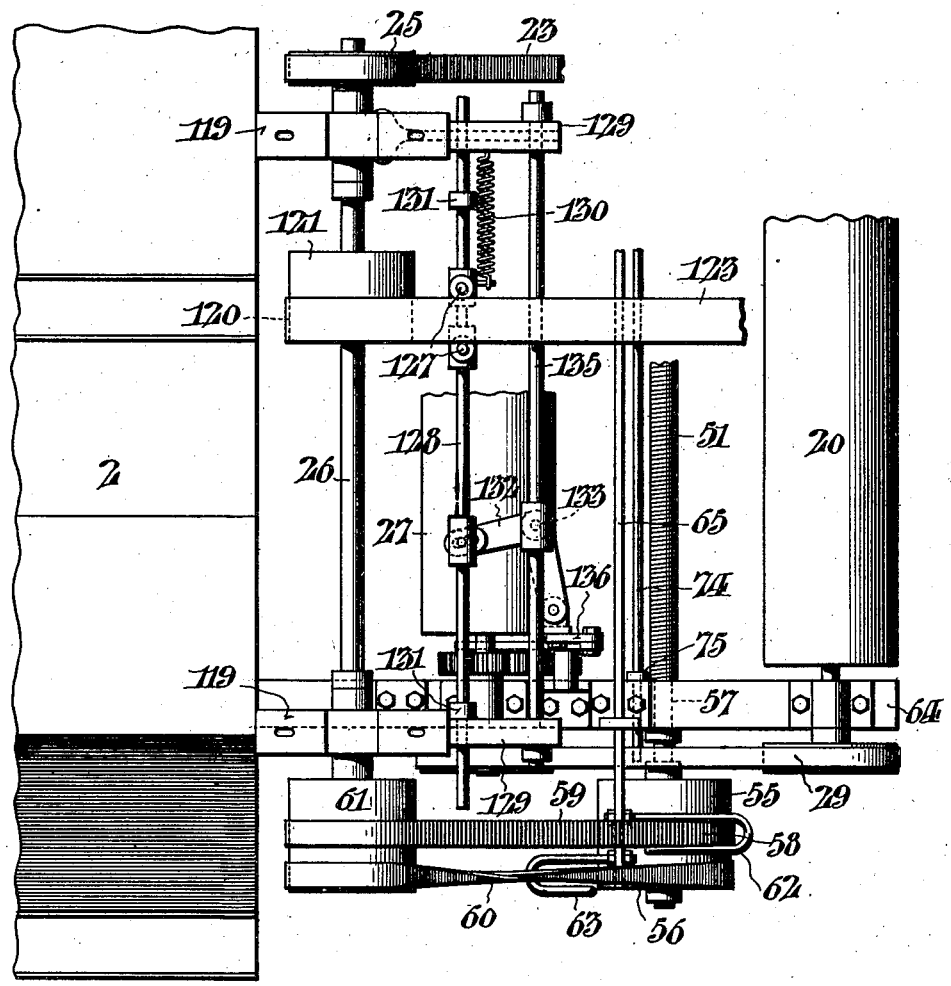

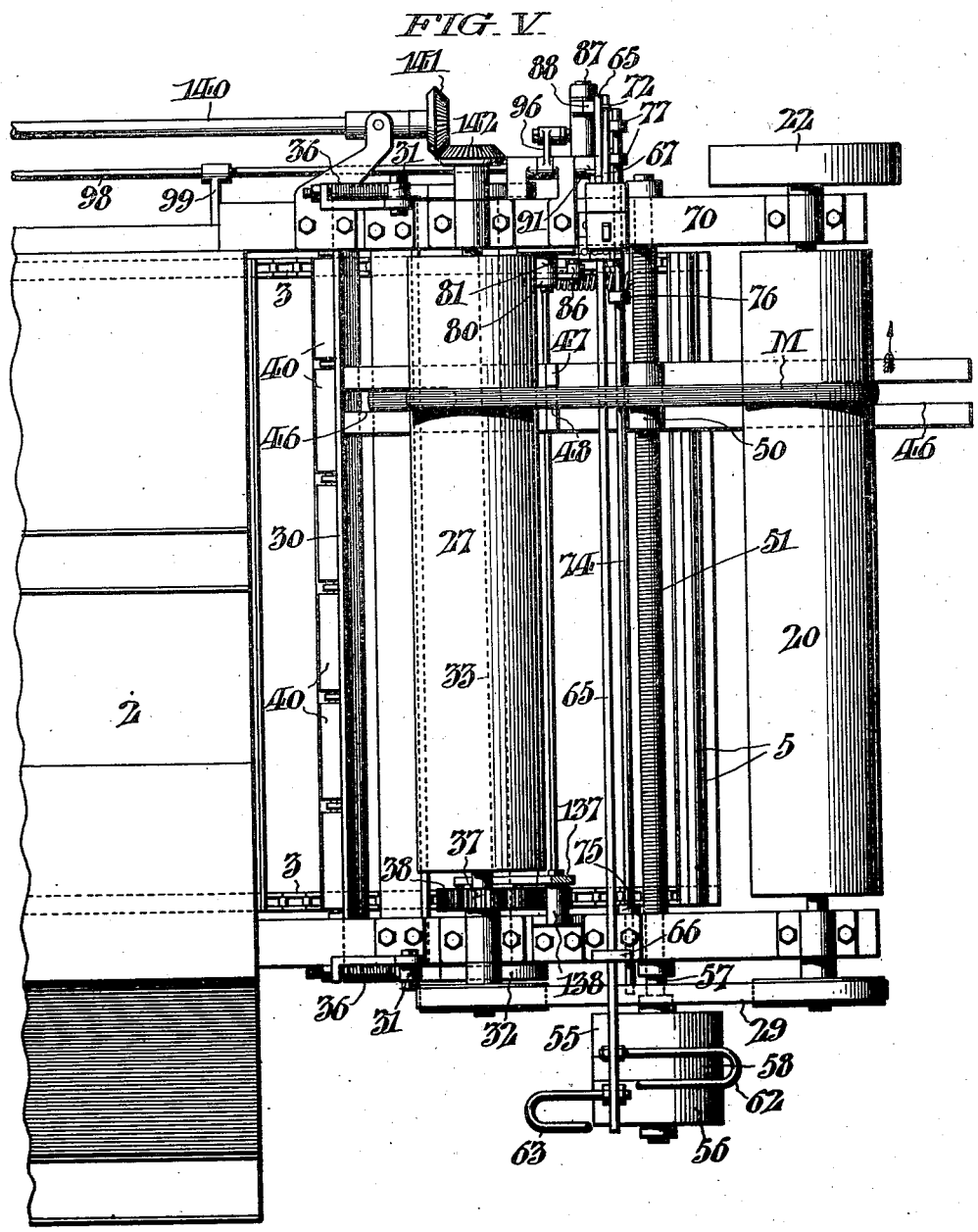

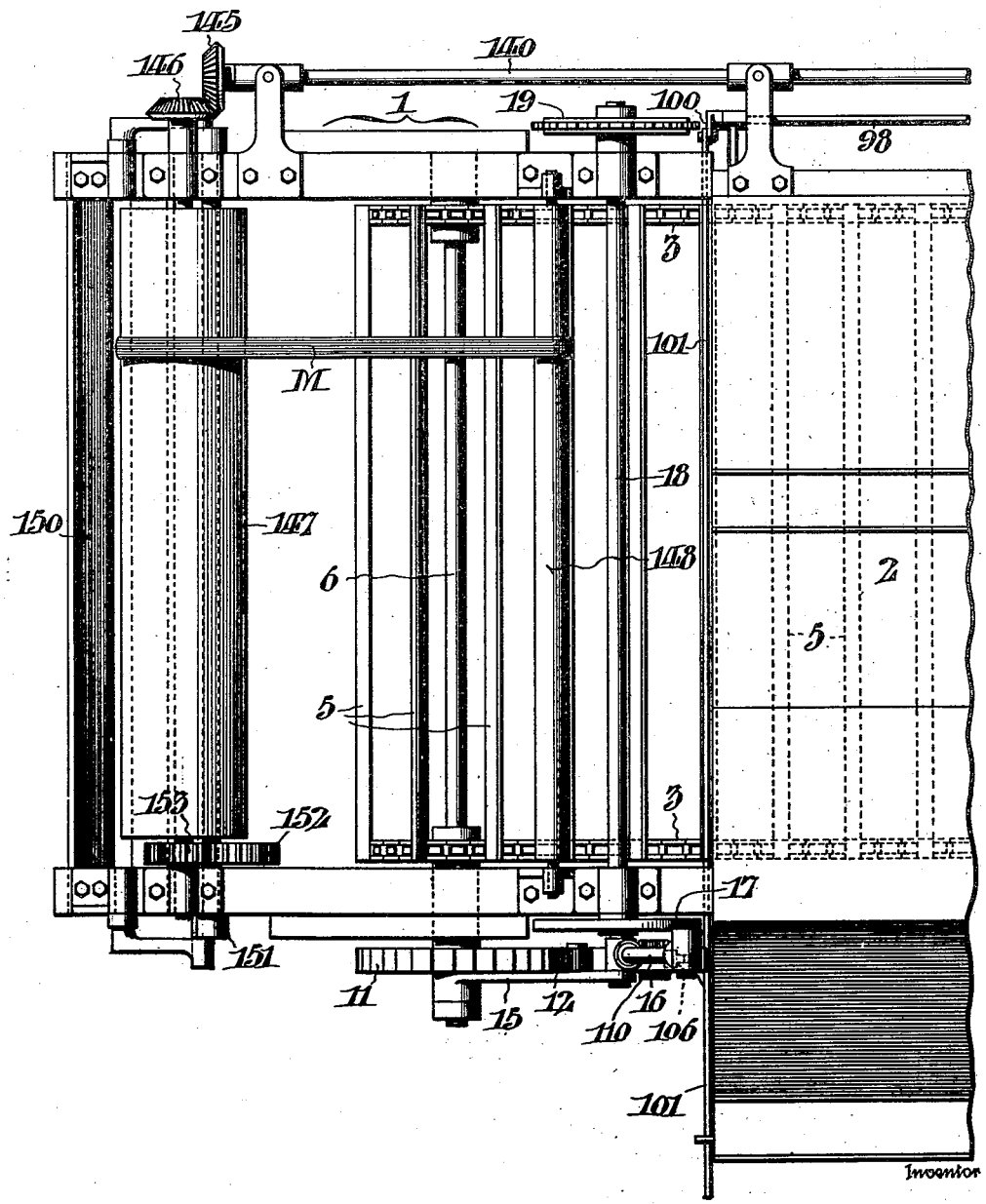

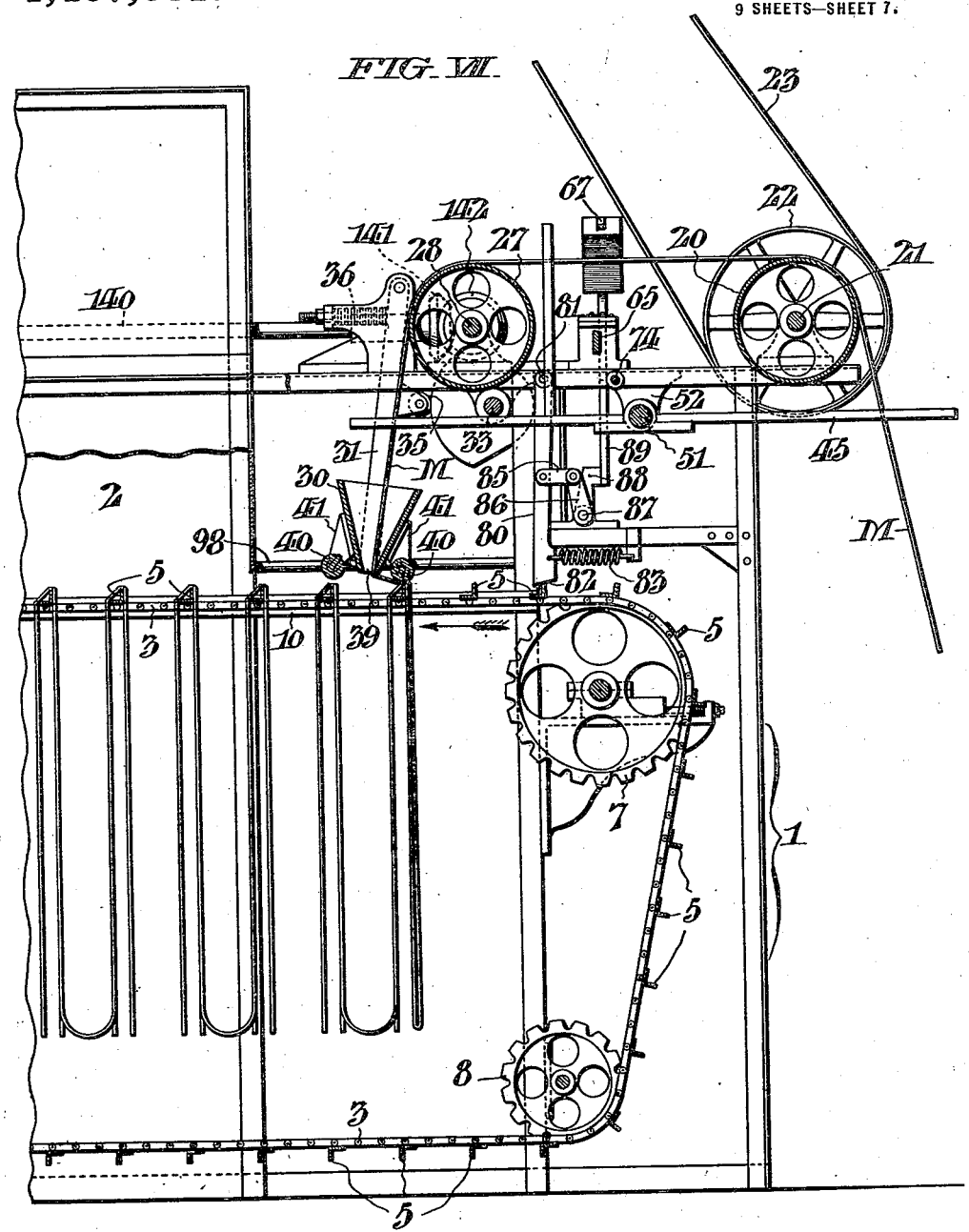

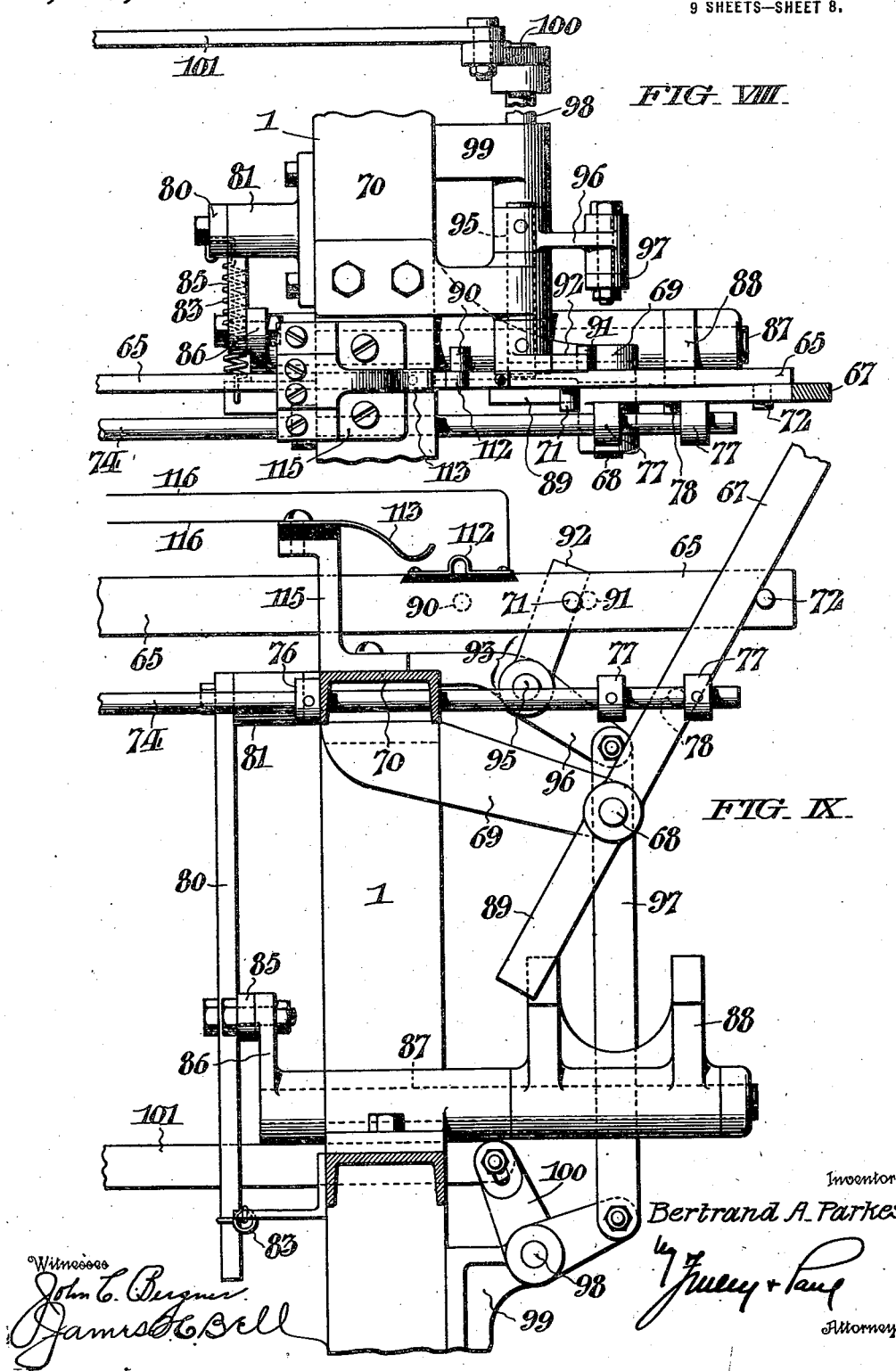

UNITED STATES PATENT OFFICE.

BERTRAND A. PARKES, OF PHILADELPHIA, PENNSYLVANIA, ASSIGNOR TO THE PHILADELPHIA DRYING MACHINERY COMPANY, OF PHILADELPHIA, PENNSYLVANIA, A CORPORATION OF PENNSYLVANIA.

TEXTILE-DRYING MACHINE.

1,407,081.     Specification of Letters Patent.     Patented Feb. 21, 1922.

Application filed March 18, 1919. Serial No. 283,293.

*To all whom it may concern:*

Be it known that I, BERTRAND A. PARKES, of Philadelphia, in the county of Philadelphia and State of Pennsylvania, have invented certain new and useful Improvements in Textile-Drying Machines, whereof the following is a specification, reference being had to the accompanying drawings.

The invention relates to drying machines employed in drying textile materials and is more especially directed to machines of the above character adapted for drying materials of great length, such as warp yarns, etc. I aim to so arrange and support the materials, during their traverse through the drying chamber of the machine, as to attain a maximum capacity, with a corresponding increase in efficiency of operation.

The preferred embodiment of my invention hereinafter described includes a feeding mechanism, whereby a series of festoon loops are formed lengthwise and in succession upon supporting bars or poles of an endless conveyer, which is intermittent in its operation. As the supporting bars of the conveyor are brought to the feeding position, an intermittently oscillating feed directs the material in succession on alternate sides of the bars, with resultant formation of the festoon loops; and contemporaneously with this action, a distributing guide determines the pitch or spacing of the loops. Means are also provided for controlling the action of the feeding mechanism so as to form connecting loops between successive conveyer bars and render the operation continuous.

In the accompanying drawings, Fig. I is an elevation of the receiving end of a drying machine embodying my invention, showing, in addition, the overhead driving means for the feed.

Fig. II is a similar elevation of the delivery end of the machine.

Fig. III is an end elevation of the same as viewed from the right of Fig. I.

Figs. IV, V and VI are respectively plan views of the portions of the machine illustrated in Figs. I, II and III.

Fig. VII is a central longitudinal sectional elevation through the receiving end of the machine.

Fig. VIII is a detail plan view of the drive controlling means for the feed.

Fig. IX is an elevation of the same as viewed from the bottom of Fig. VIII.

Fig. X is a detail in plan of the elements controlling the intermittent actuation of the conveyer by which the material is progressed through the drying machine, and Fig. XI illustrates, in perspective, the method of festooning the material about two successive conveyer bars, as accomplished automatically according to my invention.

The drying machine herein illustrated and to which my invention has been for convenience applied, is of well known construction, and may be briefly described as follows:—

Referring more particularly to Figs. I to VII inclusive, the framework of the machine consists of a structural iron skeleton 1, which serves in part to support a series of sheet iron panels forming a rectangular enclosure 2, ordinarily termed a drying chamber. In practice, this chamber is heated by any suitable means such as steam coils, and the heated air within is constantly circulated by suitable fans not shown. Said chamber is traversed by an intermittently operating conveyer consisting of two spaced endless sprocket chains 3—3, to which are attached the lateral supporting bars 5, preferably of angle iron. These bars are adapted for supporting in festoons, the material to be dried as clearly shown in Fig. VII. The chains 3—3 are driven by sprockets fixed upon shaft 6 (Fig. II) and their circuit is otherwise determined by idler sprockets 7, 8 and 9. In traveling along the active portions of their circuits, these chains are further supported by guides 10, whereby undue sagging under load is prevented.

The conveyer is driven by means of a ratchet wheel 11, fixed upon the shaft 6, (Figs. II and VI) and actuated by a pawl 12, carried by a swinging arm 15, loosely fulcrumed about said shaft. The outer end of arm 15, is coupled by means of a connecting rod 16, with a crank disk 17, fixed upon a counter shaft 18, which is journalled in suitable bearings, supported by an out-structure forming part of the skeleton of the machine. This shaft is constantly rotated by power transmitted from any convenient source to a sprocket wheel 19, thereon. (See Fig. VI.) The pawling of the ratchet wheel 11 is governed by a controlling mechanism which will be subsequently described.

Having thus pointed out the essential characteristics of the drying machine proper, it will now be convenient to refer to the related groups of mechanism which form the subject matter of my invention and whereby I am enabled to effect a peculiar festooning of the material by which the capacity of the machine is greatly increased.

This is of especial advantage in drying materials of great lengths such as warp yarns, etc. Such material "M" is fed in bunched form over a drum 20 (Figs. I, III, IV, V and VII) mounted on a shaft 21. Fixed to one end of said shaft is a pulley 22, which is driven by means of a belt 23, from a pulley 25, fixed on an overhead shaft 26, the latter forming part of an intermittent driving mechanism by which the feeding is definitely controlled and which will be later referred to in detail. Associated with the drum 20 is a companion feed drum 27, mounted on a shaft 28, and adapted to be driven in unison with the former by a belt 29. Drum 27, is functional in directing the material to an oscillating guide 30, which in turn feeds directly to the supporting bars 5 of the conveyer. This guide is trough-shaped in cross section as clearly shown in Fig. VII, and extends transversely across substantially the entire width of the conveyer,—being suspended, by means of supporting arms 31, from pivots on the frame of the machine. Oscillation is imparted to the guide 30 by cams 32, fixed to a shaft 33, and cooperating with rollers 35 carried by the arms 31, the engagement between the cams and rollers being yieldingly maintained by the coiled springs 36. Shaft 33 is driven by interposed gears 37 and 38, from the shaft 28 of drum 27. The configuration of these cams is such that a dwell takes place as the feed terminates its movement in either direction.

At each side of the outlet slot 39 of the feed are supported a series of stop rollers 40. These are journalled in slotted brackets 41, so as to be capable of a limited independent movement. As the feed is oscillated from side to side over one of the arrested supporting bars, one or the other set of the stop rollers 40 co-operates with said bar in holding the fed material to facilitate the formation of a festoon loop. Thus in Fig. VII, the roll 40 on the right has just engaged the material so that the subsequent feeding thereof will be directed to the left of the conveyer pole and the formation of the festoon loop will preceed on that side until the feed 30 is swung in the opposite direction, whereupon a festoon will be formed in a similar manner upon the right side of the conveyer bar.

In order to distribute the festooning along the length of the conveyer bars, the machine is provided, in addition to the feed just described, with a cooperating distributing guide in the form of a flat strip 45, notched at each end as at 46, and supplemented with an upright 47, similarly notched as at 48. By this arrangement the material is engaged at several points, which facilitate its progression transversely across the machine over the length of the feed drums 20 and 27. The guide is provided, near the point of the common intersection of the portions 45 and 47, with a nut 50, which is engaged by a feed screw 51. Said screw is journalled at its ends in fixed bearings 52 and is adapted for rotation in either direction, so as to move the distributing feed 45 transversely of the machine in one direction or the other accordingly. This reversal of rotation of the feed screw is accomplished as follows:—

Centrally located between two loose pulleys 55 and 56, on the extended trunnion 57, of the feed screw 51, is a fixed pulley 58, which cooperates alternately with the drive belts 59 and 60, of which the latter is crossed. Both belts transmit in their turn, power from a common pulley 61, fixed upon the overhead shaft 26, already referred to. Belts 59 and 60, are so spaced that when one is driving the fixed pulley 58 on the screw trunnion 57, the other is idle upon the corresponding loose pulley. Substitution is effected by shifter forks 62 and 63, fixed upon a slide bar 65, guided in suitable brackets 66, supported by the frame work of the machine. The shifter bar 65 is in turn actuated by a weighted lever 67, fulcrumed at 68 to a bracket 69 fixed to the channel iron 70, at the opposite side of the machine. A pair of pins 71 and 72 project from the shifter bar 65, into the path of the weighted lever 67, which, depending on its position, engages one or the other of said pins with the result that the belts 59 and 60 are correspondingly shifted.

The means for setting the weighted lever 67 in motion are directly controlled through the movements of the distributing guide which, as it terminates its lateral traverse in either direction, causes the belts 59, and 60, to be interchanged or substituted for one another in alternation, with corresponding reversal of rotation of the feed screw 51 as above noted. This controlling means comprises a slide rod 74, movable parallel to the belt shifting bar 65. Said rod is provided with stop collars 75 and 76, one located near each end, which alternately engage the adjacent inside faces of the channel irons 64 and 70 of the framework. The collars 75 and 76 lie in the path of the distributing guide 45, so that, as the latter nears the end of its traverse in either direction, the rod 74 will be moved with it, under the limitations imposed by engagement of said collars with the channel irons. This movement of the rod 74, is transmitted through collars 77—77 adjustably fixed to its protruding end (Figs. VIII and IX) to a projecting pin 78, on the weighted lever 67, so that the latter, after its weight has been shifted slightly beyond the dead center on either side, will, under the influence of gravity, tend to throw the shifter bar 65, through the interposed means already described. The actuation of the weighted lever is, however, subject to a sub-control mechanism governed in turn by the movements of the conveyer, so that the reversal of the operation of the feed screw is temporarily prevented until the conveyer has been properly shifted. The mechanism by which this is accomplished includes an arm 80 (Fig. VII) pivoted at 81, to the channel iron 70, of the framework and provided at its lower end with an inclined cam surface 82, intersecting the path of the conveyer bars 5, adjacent to one end thereof. As the conveyer bars move successively in the direction of the arrow (Fig. VII) into engagement with the arm 80, the latter will be swung in a complementary direction in opposition to the coiled spring 83, and by means of the interposed coupling link 85, and crank arm 86, will rock the shaft 87. To the outer end of this shaft is fixed a detaining fork 88, which is adapted to engage with the lower end 89 of the weighted lever 67, to hold the latter between its prongs during the progression of the conveyer. The weighted lever 67 will then be held in a substantially neutral upright position slightly inclined in the direction of the subsequent impulse to be imparted to the shifter bar 65, by virtue of the spacing of the prongs of the fork. This condition of the parts will be maintained until the conveyer has moved sufficiently to release the cam arm 80; whereupon the fork 88, is retracted and the weighted arm 65 permitted to perform its function in shifting the belts 59 and 60. After the conveyer has completed its movement or step of travel, the parts just described automatically resume the position illustrated in the drawings.

In its turn, the pawling actuation of the conveyer is controlled by the mechanism which governs the actuation of the feed screw. This may be accomplished either mechanically or electrically as may be preferred. Both forms of this control have been illustrated and the description in the order of their introduction follows:

Projecting laterally from the side of the shifter bar 65, opposite to that of the pins 71 and 72, is a second pair of pins 90 and 91, (see Fig. IX), which co-operate with the arm 92 of a bell crank lever 93, fulcrumed about a fixed pivot 95. The other arm 96 of this lever is coupled by means of a link 97, with an arm fixed upon a rock shaft 98, running longitudinally of the machine and journalled in appropriate bearings 99. At the left hand end of shaft 98 is affixed a second arm 100, which is in turn coupled by a link 101 (Fig. III) with a centrally pivoted translating lever 102, by which a sliding movement is transmitted in an opposite direction to a parallel bar 103. Said bar is formed with a double incline cam 105, (best shown in Figs. II and X) which acts to swing a pivoted stop 106, in opposition to a compression spring 107. When thrust forward, the top of said stop 106 projects into the path of the weighted leaf spring detent 13, appended to the pawl 12, and projecting beyond the opposite side of its pivot. This weighted extension 13, serves normally to maintain the pawl disengaged from the ratchet 11. When the stop 106 has been actuated in the manner just described, however the extension 13 will be engaged thereby during the succeeding down stroke of the arm 15 that carries the pawl 12, and the pawl will be yieldingly pressed into engagement with the ratchet, so that the latter will be progressed to the desired extent upon the succeeding *upward* stroke of the pawl arm. As soon as this has been effected and the cam 105, of the slide bar 103, shifted to release the stop 106, consequently the pawl will be automatically disengaged from the ratchet by its counterbalance weight, and will continue to reciprocate idly until the next operation of the stop arm.

The arrangement by which this same weight is produced electrically includes the electro-magnets 110—110 which cooperate with an armature 111, integrally formed with the pivoted pawl stop 106, as shown in Fig. X. When these magnets are energized the stop will be shifted to active position as previously noted. The energization of the magnets is controlled through the movement of the belt-shifting bar 65 (Fig. IX). Said bar is provided with a contact projection 112, suitably insulated from the bar, and co-operative with a fixed spring contact 113, secured to a bracket 115, and likewise insulated therefrom. These contacts are in series with the magnets 110 through conductors 116, and current is supplied to the circuit by suitable batteries or otherwise. After the bar 65 is shifted and is "dwelling"

by virtue of the detention of the weighted lever 67 as already explained, the electrical circuit is established between the contacts 112 and 113, and the resultant energization of the magnets 110 brings the pawl stop 106 to active position. Further movement of the shifter bar 65, to complete its motion in the same direction, opens the circuit to re-establish the normal retracted position of the pawl stop 106, under the action of its spring 107.

The feeding of the material to the machine is intermittent under the control of the conveyer movements and is brought about by the action of the driving mechanism, as will be best understood from Figs. I, IV and VII. This driving mechanism includes the overhead shaft 26, hereinbefore referred to. Said shaft is journalled in the hangers 119, and supports, intermediate its ends, a tight pulley 120, and a loose pulley 121. A belt 123, associated with these pulleys, transmits motion from the pulley 125 on the power line shaft 126, (Fig. I). The belt is transferred between the pulleys 120 and 121 by a shifter fork 127, fixed upon a slide rod 128 guided in suitable extension brackets 129 of the shaft hangers 119. As shown in Fig. IV, the rod 128 is subject to the pull of the coiled spring 130, and the motion thereof is limited by stop collars 131. Rod 128 is actuated through a pin and slot connection with a horizontally operating bell crank lever 132, fulcrumed about a fixed pivot 133. This pivot is supported by a tie bar 135 extending between the brackets 129. The other arm of the bell crank lever 132 is coupled by a link 136 with the upper end of a rocking lever 137. This lever is pivoted at 138 to a bracket supported upon the channel iron 64, of the frame of the machine, and its lower end is bent at right angles as shown in Fig. I to afford an adjustable attachment for a cam plate 139. Said cam plate lies in the path of the conveyer bars at the opposite side to that occupied by the cam arm 80, previously described in connection with the detaining mechanism for the weighted shifting lever 67. Thus, when the conveyer begins to move, the cam 139 will drop off the conveyer bar and the coiled spring 130 (Fig. IV) will immediately shift the belt 123 from the tight pulley 120, to the loose pulley 121 on shaft 26.

Since the feeding drums 20 and 27 for the material to be dried, the distributing feed screw 51, and the oscillating feed 30, are all directly or indirectly actuated from the shaft 26, their combined action will be interrupted during the idle periods of this shaft when the belt 123 is on the loose pulley 121. This idle condition will obtain during a portion of each step of progression of the conveyor,—until the succeeding supporting bar 5 again engages the lever 137 and shifts the belt 123 to the tight pulley 120, so as to cause rotation of the shaft 26 and the parts driven thereby. In practice, this mechanism is so timed as to prevent the formation of connecting loops of undue length between successive conveyer bars.

It is of course necessary that the delivery of the dried material from the machine should be effected at the same rate of speed as that of its feeding thereto. For this reason, the take-up mechanism at the delivery end of the machine (Fig. II) is operated through motion transmitted to a shaft 140, running longitudinally of the machine, and driven by means of bevel gears 141 and 142 from the shaft 28, upon which the feed roll 27 is mounted. At the opposite end, the shaft 140 in turn drives, through the bevel gears 145 and 146, a take-up roller 147, by which the material is drawn from the conveyer bars 5, as they emerge from the drying chamber 2, over a guide roll 148. The roll 147 directs the material to an oscillating folder 150 constructed and operating in a manner analogous to that of the oscillating feed already described. In the present instance, the folder swings under the actuation of a crank 151 driven by gears 152 and 153 from the shaft of the drum 147. The folder causes the material to be laid evenly in a pile as shown in Fig. II, whereby the danger of entanglement is obviated.

The operation of the machine is as follows:

Assuming the conveyer to be stationary and the distributing guide 45 to be moving slowly in the direction of the arrow in Fig. V, under the propulsion of the screw 51, and the oscillating feed 30, also stationary by virtue of the dwell on cams 32, the rotation of the feed drums 20 and 27, will advance the material downwardly to form a festoon loop on the left side of the conveyer bar 5, shown in the receiving position in Fig. VII. At this time the roller 40, on the right, is holding the material against the bar, thus acting in effect as a fixed anchorage for one end of the loop, which is automatically completed by the further feeding of the material. It will be remembered that the feeding is attended by a uniform lateral motion of the distributing guide so that the loop is formed in a direction lengthwise of the conveyer bar. The speed relation amongst these parts are such that when a loop has been completed, the oscillating feed 30 is shifted in the opposite direction and again dwells as before, the function of holding the material being now transferred to the rolls 40 at the left of the feed, and the loop formation taking place on the right side of the same bar. By this intermittent oscillation of the feed 30, in connection with the traverse of the distributing guide, a series of festoon loops will be formed along the supporting bar 5, the two opposite sides thereof alternately. The appearance of their arrangement is illustrated diagrammatically in Fig. XI,— the direction of travel of the distributing guide during the period of their formation being that indicated by the arrow at the left of this figure, and the loops being indicated by the letter L. Directly before the distributing feed has reached the end of its travel in the above direction, the collar 76 on rod 74 will be engaged and the latter gradually shifted to the right as viewed in Fig. III and the weighted arm 67 moved about its pivot to a vertical position, and released by a slight further impulse, for independent movement by gravitation. At this time, the fork 88 of the detaining mechanism is pressed forward (under the influence of the spring 83) to engage the lower end of the weighted lever 67, thereby temporarily holding the same in the advanced position, and at the same time restraining its movement until the conveyer has been properly shifted. This shifting of the conveyor follows immediately as a consequence of the motion transmitted to the bell crank 93, by the pin 90, during the aforesaid partial shifting of the bar 65, and by said bell crank 93 transmitted through the link 97, shaft 98, arm 100, slide rod 101, and translating lever 102, to the parallel slide rod 103 at the delivery end of the machine (Figs. II and III). The interruption imposed upon the weighted lever 67, by the detaining mechanism, acting through the intervening parts causes the cam 105 to dwell in engagement with the stop 108, of the pawl control; during this condition the pawl 12 is held forced into registry with the teeth of the ratchet 11, and the conveyer progressed in a manner already explained.

Shortly after the conveyer begins to move, the cam lever 137, Fig. I, will be released with the result that the parts of belt shifter 127 of the overhead driving mechanism will cause the belt 123 to be transferred to the loose pulley 121. By reason of their belted connection with the shaft 26, included in this mechanism, the operation of the feed drums 20 and 27, the distributing guide, and the oscillating feed 30 will be suspended. The time interval afforded by the slightly belated action of this belt shifting mechanism, by which this suspension is brought about, is just sufficient to permit the formation of a connecting loop between the successive conveyor bars 5. During the further movement of the conveyor, while the operation of the other parts is suspended as described, the cam arm 80 (Fig. VII) will also be released and the spring 83 will immediately retract the retaining fork 88 from the path of the weighted belt shifting lever 67. Thereupon the latter will complete its stroke, and in encountering the pin 72 will cause the shifter bar 65 to be moved to the right, to the position illustrated in Fig. IX, thus shifting the crossed belt 60 to the tight pulley 58, of the screw 51, (Fig. IV) and the open belt 50 to the idle pulley 55, in readiness for rotation in the opposite direction. This final action of the weighted lever 67 causes the cam 105 of the pawling mechanism to complete its movement in one direction and shift the pawl stop 106 out of the path of the pawl 12, so that in the succeeding descent of the pawl, the latter will be automatically released from engagement with the ratchet and resume its idle oscillations until the next setting.

When the conveyer has finally completed its movement, the parts will resume the positions illustrated, i. e., the cam levers 137 and 80, will both be engaged by the next succeeding supporting bars 5, whereby the belt 123, of the driving mechanism, Fig. IV, will again be transferred to the tight pulley 120, on shaft 26, and the parts of the feeding mechanism again set in motion as before,— with the exception that the distributing guide, owing to the reversal of its drive, will simply retrace its course in the opposite direction and the festooning proceed likewise on the conveyer bar, which has just been shifted to the feeding position.

Referring once more to Fig. XI, it will be noted that each movement of the conveyer results in the formation of an end loop, between successive supporting poles, as represented at L. These end loops will, of course, alternate for each pair of conveyer bars 5. In this way the process of festooning is rendered continuous.

In certain instances, it may be desirable to feed more than one warp bunch at a time to the machine. Under such conditions a number of the distributing guides 45, are provided and adapted for simultaneous actuation under control of the feed screw 51. The stop collars 75 and 76, are accordingly adjusted upon the rod 74 so that the reversals of the screw are effected at shorter intervals in a manner analogous to that already described thereby resulting in a corresponding simultaneous lateral distribution of the warp bunches along the conveyer poles.

My invention is capable of various modifications without departing from the principle thereof, and for this reason I do not wish to be limited to the precise details of construction and arrangement herein set forth.

Having thus described my invention, I claim:

1. A drying machine comprising a traveling conveyor with a plurality of transverse supporting bars, and means for festooning the material to be dried successively on said bars in a plurality of loops arranged lengthwise of each bar, including a guide moving back and forth transversely of the conveyor and means for reversing the movement of said guide controlled by its progress in each direction.

2. A drying machine comprising a traveling conveyor with a plurality of transverse supporting bars, and means for festooning the material to be dried successively on said bars in a plurality of loops arranged lengthwise of each bar, including a guide moving back and forth transversely of the conveyor and means for reversing the movement of said guide controlled by its progress in each direction and by the movement of the conveyor.

3. A drying machine comprising a traveling conveyor with a plurality of transverse supporting bars; means for festooning the material to be dried successively on said bars in a plurality of loops arranged lengthwise of each bar, including a guide moving back and forth transversely of the conveyor; and means controlled by the back and forth movement of said guide for producing movement of the conveyor.

4. A drying machine comprising a traveling conveyor with a plurality of transverse supporting bars; means for festooning the material to be dried successively on said bars in a plurality of loops arranged lengthwise of each bar, including a guide moving back and forth transversely of the conveyor and means for reversing the movement of said guide controlled by its progress in each direction; and means controlled by said reversing means for producing movement of the conveyor.

5. A drying machine comprising a traveling conveyor with a plurality of transverse supporting bars; means for festooning the material to be dried successively on said bars in a plurality of loops arranged lengthwise of each bar; and means controlled by movement of the conveyor for feeding the material to said festooning means.

6. A drying machine comprising an intermittently advancing conveyor with a plurality of transverse supporting bars; means for festooning the material to be dried successively on said bars in a plurality of loops arranged lengthwise of each bar, and means for feeding the material to said festooning means while the conveyor is at rest and interrupting such feed during its periods of motion.

7. A drying machine comprising an intermittently advancing conveyor with a plurality of transverse supporting bars; means for festooning the material to be dried successively on said bars in a plurality of loops arranged lengthwise of each bar, including a guide movable back and forth transversely of the conveyor; means for moving said guide transversely while the conveyor is at rest and interrupting its movement while the conveyor is in motion; and means for feeding the material to said festooning means while the conveyor is at rest and interrupting such feed during its periods of motion.

8. A drying machine comprising a traveling conveyor with a plurality of transverse supporting bars; means for festooning the material to be dried successively on said bars in a plurality of loops arranged lengthwise of each bar including a guide movable back and forth transversely of the conveyor; means controlled by the back and forth movement of said guide for producing movement of the conveyor, and by movement of the conveyor for producing back and forth movement of said guide; and means controlled by movement of the conveyor for feeding the material to said festooning means.

9. A drying machine comprising an intermittently advancing conveyor with a plurality of transverse supporting bars; means for festooning the material to be dried successively on said bars in a plurality of loops arranged lengthwise of each bar, including a guide moving back and forth transversely of the conveyor; means for producing movement of the conveyor and for reversing the movement of said guide actuated as a result of progress of the latter in each direction; and means for rendering said reversing means ineffective during movement of the conveyor.

10. A machine of the class described, including a drying chamber; a conveyor traversing said drying chamber; a series of transverse supporting bars carried by said conveyer; means for feeding the materials to be dried, including a guide operative longitudinally with respect to the conveyer bars; and a feed screw for actuating said distributing guide.

11. A machine of the class described, including a drying chamber; a conveyer traversing said drying chamber; a series of transverse supporting bars carried by said conveyer; means for feeding and distributing the materials to be dried, including a guide operative longitudinally with respect to the conveyer bars and a fed screw for actuating said distributing guide and a drive for the said screw automatically reversible under the control of the distributing feed.

12. A machine of the class described, including a drying chamber; a conveyer traversing said drying chamber; a series of transverse supporting bars carried by said conveyer; means for feeding and distributing the materials to be dried, including a guide operative longitudinally with respect to the conveyer bars and a feed screw for actuating said distributing guide; a reversible drive for the said distributing feed, including tight and loose pulleys associated with said screw; and open and crossed driving belts, and shifting means for automatically interchanging said belts in alternation upon said tight pulley under the control of said distributing guide.

13. A machine of the class described, including a drying chamber; a conveyer traversing said drying chamber; a series of transverse supporting bars carried by said conveyer; means for feeding and distributing the materials to be dried, including a guide operative longitudinally with respect to the conveyer bars and a feed screw for actuating said distributing guide; a reversible drive for the said distributing feed, including tight and loose pulleys associated with said screw; open and crossed driving belts, and a shifting bar for interchanging said belts on the tight pulley; a pivoted lever for actuating said shifter, said lever having a weighted end capable of automatically swinging to opposite sides of the pivot after being set in a position slightly beyond the neutral in either direction; and means automatically controlled by the distributing guide for setting said weighted lever.

14. A machine of the class described, including a drying chamber; a conveyer traversing said drying chamber; a series of transverse supporting bars carried by said conveyer; means for feeding and distributing the materials to be dried, including a guide operative longitudinally with respect to the conveyer bars and a feed screw for actuating said distributing guide; a reversible drive for the said distributing feed, including tight and loose pulleys associated with said screw; open and crossed driving belts, and a shifting bar for interchanging said belts on the tight pulley; a pivoted lever for actuating said shifter, said lever having a weighted end capable of automatically swinging to opposite sides of the pivot after being set in a position slightly beyond the neutral in either direction; means automatically controlled by the distributing guide for setting said weighted lever; and means controlled by the conveyer for temporarily restraining the action of the weighted lever to prevent the shifting of the said belts during the progression of the conveyer.

15. A machine of the class described, including a drying chamber; a conveyer traversing said drying chamber; a series of transverse supporting bars carried by said conveyer; means for feeding and distributing the materials to be dried, including a guide operative longitudinally with respect to the conveyer bars and a feed screw for actuating said distributing guide; a reversible drive for the said distributing feed, including tight and loose pulleys associated with said screw, open and crossed driving belts, and a shifting bar for interchanging said belts on the tight pulley; a pivoted lever for actuating said shifter, said lever having a weighted end being capable of automatically swinging to opposite sides of the pivot after being set in a position slightly beyond the neutral in either direction; means automatically controlled by the distributing guide for setting said weighted lever and means controlled by the conveyer for temporarily restraining the action of the weighted lever to prevent the shifting of the said belts during the progression of the conveyer; said restraining means including a fork adapted to engage the weighted lever and a cam arm adapted to be engaged by the conveyer-bars for controlling the action of said fork.

16. A machine of the class described, including a drying chamber; a conveyer traversing said drying chamber; a series of transverse supporting bars carried by said conveyer; means for feeding and distributing the materials to be dried, including a guide operative longitudinally with respect to the conveyer bars and a feed screw for actuating said distributing guide; a reversible drive for the said distributing feed, including tight and loose pulleys associated with said screw, open and crossed driving belts, and a shifting bar for interchanging said belts on the tight pulley; a pivoted lever for actuating said shifter, said lever having a weighted end and capable of automatically swinging to opposite sides of the pivot after being set in a position slightly beyond the neutral in either direction; and a slide rod for setting said weighted lever, and stops carried by said slide rod projecting into the path of the distributing guide so as to be engaged thereby at the end of its travel in either direction.

17. A machine of the class described, comprising a drying chamber; an intermittently operative conveyer traversing said drying chamber; devices for feeding the materials to be dried to the conveyer; and means for rendering the feeding devices inoperative during the movement of the conveyer.

18. A machine of the class described, including a drying chamber; an intermittently operative conveyer traversing said drying chamber; a series of transverse supporting bars carried by said conveyer; means for feeding the materials to be dried to the conveyer bars; and means actuated by said bars for rendering the feed idle during the motion of the conveyer.

19. A machine of the class described, including a drying chamber; an intermitently operative conveyer traversing said drying chamber; a series of transverse supporting bars carried by said conveyer; devices for feeding the materials to be dried; driving means for said feeding devices, including a shaft having tight and loose pulleys, a driving belt for said pulleys; a belt shifter; and an operating lever for said shifter lying in the path of the conveyer bars and cooperating with them to cause the belt to be shifted to the idle pulley to render the feeding devices inoperative during the motion of the conveyer.

20. A machine of the class described, including a drying chamber; an intermittently operative conveyer traversing said drying chamber; a series of transverse supporting bars carried by said conveyer; a reciprocating guide for feeding the materials longitudinally to the conveyer bars; driving means for the conveyer comprising a ratchet wheel, a continuously oscillating arm, and a pawl carried by said arm and normally inactive upon said ratchet; and means actuated by the reciprocating feed at the end of its travel in either direction for rendering the pawl of the conveyer drive active.

21. A machine of the class described, including a drying chamber; an intermittently operative conveyer traversing said drying chamber; a series of transverse supporting bars carried by said conveyer; a reciprocating guide for feeding the materials longitudinally to the conveyer bars; driving means for the conveyer comprising a ratchet wheel, a continuously oscillating arm, and a pivoted pawl carried by said arm and having a weighted extension normally maintaining said pawl in inactive position; a stop for engaging the weighted extension of the pawl; a cam for shifting said stop into the path of the weighted arm of the pawl; and means actuated by the said reciprocating guide at the end of its travel in either direction for controlling said cam to effect the pawling of the latter.

22. A machine of the class described, including a drying chamber; a conveyer traversing said drying chamber; a series of transverse supporting bars carried by the said conveyer; means for intermittently driving said conveyer; a feed for the material to be dried; a reciprocating guide for distributing the material longitudinally of the conveyer bars while directed thereto by the feed; driving means common to the feed and the distributing guide; and means controlled by the conveyer for rendering the said common driving means for the feed and the guide idle during the progression of the conveyer.

In testimony whereof, I have hereunto signed my name, at Philadelphia, Pennsylvania, this 12th day of March, 1919.

BERTRAND A. PARKES.

Witnesses:
JAMES H. BELL,
E. L. FULLERTON.